United States Patent [19]

Firth, Jr.

[11] 4,274,860
[45] Jun. 23, 1981

[54] METHOD FOR STIMULATING GROWTH IN FOLIAGE PLANTS

[75] Inventor: William C. Firth, Jr., Robbinsville, N.J.

[73] Assignee: Union Camp Corporation, Wayne, N.J.

[21] Appl. No.: 109,794

[22] Filed: Jan. 7, 1980

Related U.S. Application Data

[63] Continuation-in-part of Ser. No. 924,146, Jul. 13, 1978, abandoned.

[51] Int. Cl.$^3$ .............................................. C05F 11/02
[52] U.S. Cl. ................................. 71/24; 71/64 SC; 71/31; 71/63
[58] Field of Search ................. 47/1 A; 71/24, 79, 80, 71/64 SC, DIG. 1, 31, 63

[56] References Cited

U.S. PATENT DOCUMENTS

| | | | |
|---|---|---|---|
| 3,122,752 | 3/1965 | Pierce | 71/79 |
| 3,418,100 | 12/1968 | Cooley | 71/24 |
| 3,544,296 | 12/1970 | Karche | 71/24 |
| 4,069,034 | 1/1978 | Hoover | 71/24 |
| 4,071,347 | 1/1978 | Piccolo | 71/64 SC |

OTHER PUBLICATIONS

Chemical Abstracts, 78:100427p, 1972.
Condensed Chem. Dictionary, 1976, pp. 446, 760.

*Primary Examiner*—William F. Smith
*Attorney, Agent, or Firm*—Kane, Dalsimer, Kane, Sullivan and Kurucz

[57] ABSTRACT

The disclosure is of a method for stimulating growth in a foliage plant. The method comprises potting the plant in a conventional potting medium to which there has been added a humate which was previously associated with a rutile sand deposit. The disclosure is also of improved potting mediums for foliage plants, which include rutile sand deposit derived humate.

4 Claims, No Drawings

METHOD FOR STIMULATING GROWTH IN FOLIAGE PLANTS

CROSS REFERENCE TO RELATED APPLICATION

This application is a continuation-in-part of my U.S. application Ser. No. 924,146 filed July 13, 1978 abandoned.

BACKGROUND OF THE INVENTION

1. Field of the Invention

The invention relates to methods of stimulating plant growth and more particularly relates to potting mediums and their use to stimulate foliage plant growth.

2. Brief Description of the Prior Art

Humic acid containing materials such as peats, humates, lignites, leonardite and the like have been proposed heretofore for use as ingredients of plant fertilizer compositions. Conventional potting mediums for foliage plants have traditionally included, for example, peat as a component thereof. In spite of the fact that peat contains humic acid substances, we have found that the addition of a particular humate substance as an active ingredient of the potting media unexpectedly increases and stimulates the growth of foliage plants beyond the point that can be attributed to the peat. It is unexpected that the particular humate employed will affect foliage plants in this manner since humate is characterized by relatively high titanium and aluminum metal contents. These metals were generally heretofore considered to be toxic to foliage plants. Apparently at the levels found in the humate materials employed in the method of the invention, they are tolerable. In addition, the humate substance employed in the method of the present invention is of such a character that it would ordinarily be expected to reduce the water permeability of the potting medium. This, of course, is undesirable for the growth of foliage plants. However, the humate employed unexpectedly has no significant adverse effect on the water permeability of a potting media.

SUMMARY OF THE INVENTION

The invention comprises a method of stimulating the growth of foliage plants, which comprises; potting the plants in a foliage plant potting media which includes as an active ingredient a humate, said humate being one derived from an association with a rutile sand deposit.

The invention also comprises, in a conventional potting media for stimulating growth of foliage plants, the improvement which comprises the presence of from 0.1 percent to 10 percent by volume of a humate, said humate being one derived from an association with a rutile sand deposit.

The term "foliage plant" as used throughout the specification and claims means those plants grown primarily for their foliage and utilized for interior decoration and landscape purposes. While foliage plants may have flowers, these will be secondary to the foliage. The source of this definition is "Using Florida Grown Foliage Plants," Bulletin 746, October, 1971, Florida Agricultural Experiment Station, University of Florida. Representative of foliage plants are those of the genus Calethea, Chamaedorea, Philodendron and the like.

The term "conventional potting media" as used throughout the specification and the claims means the known mixtures employed as a natural soil substitute to grow foliage plants described herein. Such mixtures are used extensively by plant growers to assist the plant to develop and maintain a functional root system of a quality which will enhance plant growth. The conventional potting media functions to support the plant, serve as a reservoir for water and nutrients and as an interface for gaseous exchange with the roots. The ingredients of a conventional potting media may include both organic and inorganic ingredients. Tree barks, ranging in size from coarse, chunky pieces to the size of fine to very fine sand particles can be used as the organic component. Peat and mosses can also be used as the organic component as well as shavings or chips of hard and soft-woods. Inorganic ingredients which may be used to make conventional potting media include for example sand, perlite, vermiculate, fine gravel and the like.

Conventional potting media also may contain nutrient materials such as mulches, natural soil, fertilizers and the like. All of the ingredients employed in admixture to obtain a "conventional potting media" are used in proportions which will yield a media porosity wherein about 50 percent of the pores present in the media will hold water and the remaining 50 percent will not, i.e.; are available for gases. A number of specific "conventional potting media" formulations have been suggested by the University of California (See Manual 23, Div. of Ag. Sciences, Univ. of Calif. "The U.C. System for Producing Healthy Container-Grown Plants" edited by Kenneth F. Baker, Sept. 1957).

The term "humate" as used throughout the specification and claims refers to the product of natural flocculation or precipitation in sand deposits, of humic substances that were derived from natural leaching of the decayed plant and animal material (humus). The humate employed in the method and compositions of the invention are generally found in associate with rutile sand deposits and contain humic substances which may be active ingredients in stimulating growth of foliage plants.

The term "humate derived from an association with rutile sand deposits" as used throughout the specification and claims means a humate, initially found in association with rutile sand deposits and at least partially separated therefrom for use in the method of the present invention.

The term "humic acid" has been widely applied to acidic solids obtained from plant decompositions. More recently, humic acids have been regarded as the intermediate product or products which result in the conversion of lignin and other plant materials to hard coal. It is believed that in the decomposition of vegetable matter, that the portion of the cell wall material consisting largely of lignin is converted into humus. In time, the humus may be converted progressively to peat, brown coal, bituminous coal and finally into anthracite. More usually, "humic substance" is applied as a generic term for the organic acids derived from humus or the top layer of the soil, containing organic decomposition products of vegetation and animal organisms in admixture with inorganic compounds, sands, minerals, metal hydroxide bases etc. The chemical structure of the humic acids has not been established, but they are believed to be large condensed ring, polymer-like molecules containing pendant carboxylic and phenolic groups. Depending on their solubilities, humic substances are usually classified as humic acid, fulvic acid, hymatomelanic acid or humin.

DETAILED DESCRIPTION OF THE INVENTION

The humate compositions employed in the method of the invention are naturally occurring compositions of matter found in association with rutile sands. Rutile sand deposits are found in several places throughout the world. In the United States, rutile sand deposits are located in Florida, Georgia and South Carolina. The rutile sands are in a formation commonly referred to as "hardpan." The hardpan comprises rutile sands bound together by a coating of humate. It is this humate which is employed in the present invention.

The desired humate may be separated from the rutile sand deposits by first breaking up the deposit formation of hardpan into a ground ore of a convenient size for handling. Much of the humate in the ground ore can be washed off with water to effect the desired separation. Additional humate can be obtained by washing the concentrated ore with aqueous sodium hydroxide. The aqueous mixture containing the free humates may then be treated with, for example, a strong mineral acid such as sulfuric acid or alum to regain the natural pH of the humate and facilitate settling out of the suspended humate. The separated humate may then be dried in the sunlight or by artificial means. The separated humate is unique, compositionally, and contains a high degree of oxygenated compounds. The average composition of rutile sand humate is as follows:

COMPOSITION OF RUTILE SAND HUMATE

| Elemental Composition (Dry Basis) (%) | | | | | "As Is" Moisture | Composition, Wt. Percent | |
|---|---|---|---|---|---|---|---|
| C | H | O | N | S | | Ash ("As Is") | Ash (Dry Basis) |
| 36.7 | 2.3 | 23.7 | 0.6 | 0.3 | 9.8 | 30.9 | 34.3 |

| Funtional Group Contents (Dry Basis) meg/g* | | Ratios, Wt./Wt. (Dry Basis) | |
|---|---|---|---|
| Total Acidity | Carboxylic Acid | C:H | C:O |
| 6.0 | 2.1 | 16.0:1 | 1.5:1 |

| Metal Contents (Dry Basis) (%) | | | |
|---|---|---|---|
| AL | Ti | Fe | Ca |
| 6 | 1 | 1 | 0.1 |

*Methods for the functional group analysis may be found in M. Schnitzer and S. U. Khan, "Humic Substances in the Environment," Marcel Dekker, Inc., New York, New York, 1972, pp. 39–41. The barium hydroxide method for total acidity and calcium acetate method for carboxylic acid groups described in the citation were used.

It will be appreciated that the above analysis is for a specific material and the compositional make-up of rutile sand humate may vary somewhat for different materials within the same sand body. In general, the humate compositions employed in the method of the invention have compositional make-ups which provide a carbon to hydrogen ratio (weight to weight) of from 9.5–17.5:1.0; a carbon to oxygen ratio of 1.0–2.0:1.0; an aluminum content of 2.8 to 8.4 percent by weight; a titanium content of 0.5 to 1.5 percent by weight and a calcium content of less than 0.5 percent by weight.

It will also be appreciated from the above analysis that rutile sand associated humates contain substantially large proportions of some metals, particularly aluminum and titanium as well as a lower calcium content than is generally found in humates obtained from other sources. For example, leonardite is a humate substance closely related in composition. A commercially available leonardite has the following composition:

COMPOSITION OF A LEONARDITE

| Elemental Composition (Dry Basis) (%) | | | | "As Is" Moisture | Composition, Wt. Percent | |
|---|---|---|---|---|---|---|
| C | H | O | S | | Ash ("As Is") | Ash (Dry Basis) |
| 50.61 | 2.80 | 19.83 | 1.15 | 15.50 | 16.87 | 19.96 |

| Functional Group Contents (Dry Basis) meg/g | | Ratios, Wt./Wt. | |
|---|---|---|---|
| Total Acidity | Carboxylic Acid | C:H | C:O |
| 5.3 | 1.8 | 18.1:1 | 2.6:1 |

| Metal Contents (Dry Basis) % | | | |
|---|---|---|---|
| AL | Ti | Fe | Ca |
| 0.8 | 0.06 | 1.1 | 2.4 |

It will be appreciated from a comparison of the analysis for the commercial leonardite that humates associated with rutile sand deposits generally have lower carbon to hydrogen and carbon to oxygen ratios. It is believed that these compositional differences of rutile associated humates accounts for the functional advantages associated with their use as plant growth stimulators. I believe that the humate could have a beneficial effect on the transfer of micronutrients to the plants or directly affect their growth through a plant growth regulator effect. It is well known that small amounts of certain organic compounds can have a remarkable effect on the growth of plants; see "Humic Substances in the Environment," supra., pp. 298–301.

The method of the invention is carried out by first providing the above described humate, separated from its previous association with rutile sand deposits. The rutile sand derived humate is employed in the method of the invention by simple admixture with conventional potting medias employed to initiate growth in foliage plants. In general, the proportion of humate employed is within the range of about 0.1 to about 10 percent by volume of the potting media. In the case of the Chamadorea, a proportion of 0.1 to 5 percent is most advantageous and in the case of the Calathea, a proportion of 1.0 to 10.0 percent is preferred.

The following examples describe the manner and process of making and using the invention and set forth the best mode contemplated by the inventor of carrying out the invention but are not to be construed as limiting.

EXAMPLE 1

A total of 90 pot type containers (5" diameter) suitable for potting Calathea makoyana (peacock plant) was provided with 90 clumps (3–7 plants/clump) for potting, in the containers. The pots and plants were divided into three series of 30 each, identified by the sequential letters A–C. Each series was further divided into six groups of 5 pots (giving 5 replications) identified by the sequential numbers 1–6, inclusive. The plants were potted in an assigned pot within the groups 1–6, employing a different potting medium for each of the groups 1–6. The potting mediums differ by relative proportions of humate derived from association with rutile sands and having the specific composition and analysis set forth above and Florida peat component. Representative portions of each potting media were subjected to chemical and physical analysis. The analysis was as follows:

| | Potting Media[1] | | | | pH | | Soluble Salts (ppm) | |
|---|---|---|---|---|---|---|---|---|
| No. | Rutile Sand Humate | Florida Peat | Pine Bark | Cypress Shavings | Water:Soil[2] 2:1 | Saturated Paste | Water:Soil[2] 2:1 | Saturated Paste |
| 1 | 0 | 50.0 | 25 | 25 | 5.2 | 5.0 | 1293.6 | 2951.2 |
| 2 | .1 | 49.9 | 25 | 25 | 5.2 | 5.1 | 1170.4 | 2738.4 |
| 3 | 5 | 45.0 | 25 | 25 | 5.1 | 4.9 | 1545.6 | 2805.6 |
| 4 | 10 | 40.0 | 25 | 25 | 5.0 | 5.0 | 1310.4 | 2892.4 |
| 5 | 25 | 25.0 | 25 | 25 | 4.6 | 4.2 | 1066.8 | 2027.2 |
| 6 | 50 | — | 25 | 25 | 4.8 | 4.5 | 1061.2 | 1694.0 |

| | CEC* by volume | WHC** | Pore Space (%) | | |
|---|---|---|---|---|---|
| No. | meq/cc | % by volume | Capillary | Non-Capillary | Total |
| 1 | 6.7 | 60.2 | 60.3 | 13.9 | 74.2 |
| 2 | 5.8 | 65.6 | 65.6 | 13.4 | 79.0 |
| 3 | 14.4 | 55.5 | 56.1 | 17.1 | 73.2 |
| 4 | 15.6 | 54.3 | 54.3 | 15.7 | 70.0 |
| 5 | 6.4 | 49.4 | 49.4 | 13.6 | 63.0 |
| 6 | 14.7 | 52.9 | 52.9 | 18.4 | 71.3 |

[1] Percent of each by volume.
[2] 2 parts water to 1 part potting media by volume
*CEC = Cation Exchange Capacity
**WHC = Water Holding Capacity After potting, the potted plants were held for about 156 days under the following growing conditions.
Temperature: 70° F.–95° F.
Percent Shade: Approximately 90.
Light (foot candles): 1,200 to 1,500.
Water frequency: Three times a week
During the growth period, fertilizer (19-6-12 Osmocote) was applied at the start and after about 90 days. The rate of fertilizer application was varied between the series A–C as follows:

| RATE OF FERTILIZER APPLICATION | | |
|---|---|---|
| Series A | Series B | Series C |
| 600 lbs. nitrogen per acre per year | 1200 lbs. nitrogen per acre per year | 1800 lbs. nitrogen per acre per year |

During growth period, pesticides (Kelthane, Pentac or Sevin) were applied uniformly on occasion to each plant.

At the termination of the growth period, each plant was evaluated for its growth during the period. The results of the evaluation are shown in Table 1 below together with the composition of the potting media used for each plant. The reported figures are averages for all of the plants in each potting mixture.

TABLE 1

| Potting Mixture Results with *Calathea makoyana* | | | | | |
|---|---|---|---|---|---|
| | Potting Media[1] | | | | Average Number Leaves | Average Plant Grade[2] |
| No. | Rutile Sand Humate | Florida Peat | Pine Bark | Cypress Shavings | | |
| 1 | 0 | 50.0 | 25 | 25 | 28.2 | 3.3 a[3] |
| 2 | .1 | 49.9 | 25 | 25 | 23.2 | 3.3 a |
| 3 | 5 | 45.0 | 25 | 25 | 25.7 | 4.1 b |
| 4 | 10 | 40.0 | 25 | 25 | 27.1 | 4.2 b |
| 5 | 25 | 25.0 | 25 | 25 | 27.3 | 3.8 b |
| 6 | 50 | — | 25 | 25 | 25.5 | 3.8 b |

[1] Percent of each by volume.
[2] 1 = poor quality, 3 = good, salable, 5 = excellent quality
[3] Mean separation between columns as determined by Duncan's multiple range, 1% level. [D. B. Duncan, Biometrics, 11, 1 (1955)].

It will be observed from the Table 1 that the average plant grade was significantly improved when 5 percent or more by volume of the rutile sand derived humate was an active ingredient in the potting media.

In the above example, the plant evaluation of each of the three series, according to the rate of fertilizer application, showed that the level (rate) of fertilizer application provided no interaction with the humate presence. The average number of leaves and the plant grade average according to each of the series A–C is shown in Table 2, below.

TABLE 2

| Fertilizer Results with *Calathea makoyana* | | | |
|---|---|---|---|
| Series | Fertilizer Rate lbs. N/A/hr | Average No. Leaves | Average Plant Grade[2] |
| A | 600 | 23.3 a[3] | 3.2 a |
| B | 1200 | 27.6 b | 4.0 b |
| C | 1800 | 27.6 b | 4.0 b |

[2] 1 = poor quality; 3 = good, salable, 5 = excellent quality.
[3] Mean separation between columns as determined by Duncan's multiple range, 1% level.

EXAMPLE 2

The procedure of Example 1, supra, was repeated except that the plant *Calethea makoyana* as used therein was replaced with three *Chamaedorea elegans* (parlor palm) plants. The plant growth evaluations (average) are shown in Table 3 below, together with the composition of the potting medias used for the plants.

TABLE 3

Results with *Chamaedorea Elegans*

| | No. | Potting Media[1] Rutile Sand Humate | Florida Peat | Pine Bark | Cypress Shavings | Application Rate Fertilizer lbs N/A/yr | Average Top wt. (gms) | | Average Plant Grade[3] |
|---|---|---|---|---|---|---|---|---|---|
| Series A | 1 | 0 | 50.0 | 25 | 25 | 600 | 6.4 | abc[4] | 2.6 abc |
| | 2 | .1 | 49.9 | 25 | 25 | 600 | 9.7 | bcde | 3.3 bcdef |
| | 3 | 5 | 45.0 | 25 | 25 | 600 | 10.5 | de | 3.7 cdefg |
| | 4 | 10 | 40.0 | 25 | 25 | 600 | 6.2 | ab | 2.9 bcde |
| | 5 | 25 | 25.0 | 25 | 25 | 600 | 5.3 | a | 2.5 ab |
| | 6 | 50 | — | 25 | 25 | 600 | 6.9 | abc | 3.3 bcdef |
| Series B | 7 | 0 | 50.0 | 25 | 25 | 1200 | 12.2 | ef | 4.0 efg |
| | 8 | .1 | 49.9 | 25 | 25 | 1200 | 14.4 | f | 4.2 fg |
| | 9 | 5 | 45.0 | 25 | 25 | 1200 | 9.7 | bcde | 3.8 defg |
| | 10 | 10 | 40.0 | 25 | 25 | 1200 | 7.5 | abcde | 3.2 bcdef |
| | 11 | 25 | 25.0 | 25 | 25 | 1200 | 6.7 | abc | 2.9 bcde |
| | 12 | 50 | — | 25 | 25 | 1200 | 6.4 | abc | 2.9 bcde |
| Series C | 13 | 0 | 50.0 | 25 | 25 | 1800 | 5.9 | a | 2.5 ab |
| | 14 | .1 | 49.9 | 25 | 25 | 1800 | 12.2 | ef | 4.2 fg |
| | 15 | 5 | 45.0 | 25 | 25 | 1800 | 12.6 | ef | 4.5 g |
| | 16 | 10 | 40.0 | 25 | 25 | 1800 | 10.0 | cde | 3.8 defg |
| | 17 | 25 | 25.0 | 25 | 25 | 1800 | 6.8 | abc | 2.7 abcd |
| | 18 | 50 | — | 25 | 25 | 1800 | 4.0 | a | 1.9 a |

[1]Percent of each by volume.
[3]1 = poor quality, 3 = good, salable, 5 = excellent quality.
[4]Mean separation between columns as determined by Duncan's multiple range, 1% level. (D. B. Duncan, loc. cit.)

The averages for the three series A–C are collated in Table 4, below.

TABLE 4

Effect of Potting Mixture on *Chamaedorea elegans*

| | Potting Media[1] | | | | Average Growth | | | |
|---|---|---|---|---|---|---|---|---|
| No. | Rutile Sand Humate | Florida Peat | Pine Bark | Cypress Shavings | Height (cm) | Top wt. (gms) | Root wt. (gms) | Plant Grade[2] |
| 1 | 0 | 50.0 | 25 | 25 | 22.6 cd[3] | 3.2 b[3] | 3.0 bc[3] | 3.0 ab[3] |
| 2 | .1 | 49.9 | 25 | 25 | 23.5 d | 12.1 c | 4.3 d | 3.9 c |
| 3 | 5 | 45.0 | 25 | 25 | 22.9 cd | 10.9 c | 4.1 d | 4.0 c |
| 4 | 10 | 40.0 | 25 | 25 | 21.5 c | 7.9 b | 3.2 c | 3.4 b |
| 5 | 25 | 25.0 | 25 | 25 | 19.7 b | 6.3 ab | 2.2 b | 2.7 a |
| 6 | 50 | — | 25 | 25 | 17.6 a | 5.8 a | 1.3 a | 2.7 a |

[1]Percent of each by volume.
[2]1 = poor quality, 3 = good, salable, 5 = excellent quality.
[3]Mean separation between columns as determined by Duncan's multiple range, 1% level. (D. B. Duncan, loc. cit.)

As may be seen in Tables 3 and 4, the best height, top weight, root weight and plant grade growth indicators occurred when 0.1 percent by volume of the rutile sand humate was incorporated in the potting medium. However, a 5 percent level of the same humate also provided excellent growth increases. In this example, the 1200 or 1800 lb. nitrogen level fertilizer rate generally provided the best growth as shown in Table 5, below.

TABLE 5

Effect of Fertilizer Level on *Chamaedorea elegans*

| Series | Fertilizer Rate lbs N/A/yr | Height (cm) | Root wt. (gms) | Top wt. (gms) | Plant Grade[2] |
|---|---|---|---|---|---|
| A | 600 | 20.6 a[3] | 2.9 | 7.5 a[4] | 3.0 |
| B | 1200 | 22.3 b | 3.3 | 9.5 b | 3.5 |
| C | 1800 | 20.9 a | 2.8 | 8.6 ab | 3.3 |

[2]1 = poor quality, 3 = good, salable, 5 = excellent quality.
[3]Mean separation between columns as determined by Duncan's multiple range, 1% level. (D. B. Duncan, loc. cit.)
[4]Mean separation between columns as determined by Duncan's multiple range, 5% level. (D. B. Duncan, loc. cit.)

EXAMPLE 3

The procedure of Example 1, supra, was repeated except that the clumps of *Calathea makoyana* as used therein was replaced with three *Philodendron scandens oxycardium* (heart leaved philodendron) plants and the rate of fertilizer application was as follows:

| RATE(LBS. NITROGEN PER ACRE PER YEAR) | | |
|---|---|---|
| Series A | Series B | Series C |
| 750 | 1500 | 2250 |

The plant growth evaluations by measurement of the average vine length at the end of the growth period are shown in Table 6, below, together with the compositional make-up of the potting medium. The reported figures are averages for the indicated series and groups.

TABLE 6

Results with *Philodendron Scandens Oxycardium*

| | No. | Potting Media[1] Humate | Florida Peat | Pine Bark | Cypress Shavings | Fertilizer Rate lbs N/A/yr | Average Vine length (cm) |
|---|---|---|---|---|---|---|---|
| Series A | 1 | 0 | 50.0 | 25 | 25 | 750 | 32.4 bc[3] |

TABLE 6-continued

Results with *Philodendron Scandens Oxycardium*

|  | No. | Potting Media[1] | | | | Fertilizer Rate lbs N/A/yr | Average Vine length (cm) |
|---|---|---|---|---|---|---|---|
|  |  | Humate | Florida Peat | Pine Bark | Cypress Shavings |  |  |
|  | 2 | .1 | 49.9 | 25 | 25 | 750 | 46.1 d |
|  | 3 | 5 | 45.0 | 25 | 25 | 750 | 36.5 cd |
|  | 4 | 10 | 40.0 | 25 | 25 | 750 | 28.8 bc |
|  | 5 | 25 | 25.0 | 25 | 25 | 750 | 27.4 abc |
|  | 6 | 50 | — | 25 | 25 | 750 | 29.9 bc |
| Series B | 7 | 0 | 50.0 | 25 | 25 | 1500 | 22.8 ab |
|  | 8 | .1 | 49.9 | 25 | 25 | 1500 | 36.7 cd |
|  | 9 | 5 | 45.0 | 25 | 25 | 1500 | 20.7 ab |
|  | 10 | 10 | 40.0 | 25 | 25 | 1500 | 31.1 bc |
|  | 11 | 25 | 25.0 | 25 | 25 | 1500 | 34.6 bcd |
|  | 12 | 50 | — | 25 | 25 | 1500 | 22.7 ab |
| Series C | 13 | 0 | 50.0 | 25 | 25 | 2250 | 32.0 bc |
|  | 14 | .1 | 49.9 | 25 | 25 | 2250 | 29.0 bc |
|  | 15 | 5 | 45.0 | 25 | 25 | 2250 | 33.8 bcd |
|  | 16 | 10 | 40.0 | 25 | 25 | 2250 | 29.2 bc |
|  | 17 | 25 | 25.0 | 25 | 25 | 2250 | 32.6 bc |
|  | 18 | 50 | — | 25 | 25 | 2250 | 17.2 a |

[1]Percent of each of volume.
[3]Mean separation between columns as determined by Duncan's multiple range, 1% level. (D. B. Duncan, loc. cit.)

A collation of the vine length figures with a plant evaluation by leaf size, top weight, root weight and plant grade is shown in Table 7, below. The figures given in Table 7 are averages for all plants in the different potting compositions.

TABLE 7

Effect of Potting Mixture on *Philodendron scandens oxycardium*

| No. | Potting Media[1] | | | | Averages | | | | |
|---|---|---|---|---|---|---|---|---|---|
|  | Rutile Sand Humate | Florida Peat | Pine Bark | Cypress Shavings | Leaf[2] Size (cm) | Top wt. (gms) | Vine Length (cm) | Root wt. (gms) | Plant Grade[3] |
| 4 | 0 | 50.0 | 25 | 25 | 6.7 | 33.4 b[4] | 29.0 ab[4] | 2.8 b[4] | 2.8 ab[4] |
| 2 | .1 | 49.9 | 25 | 25 | 6.7 | 40.8 b | 37.3 c | 5.0 d | 3.8 c |
| 3 | 5 | 45.0 | 25 | 25 | 6.8 | 37.8 b | 30.3 abc | 4.0 c | 3.3 bc |
| 4 | 10 | 40.0 | 25 | 25 | 6.6 | 35.3 b | 29.7 ab | 3.9 c | 3.2 bc |
| 5 | 25 | 25.0 | 25 | 25 | 6.6 | 35.4 b | 31.5 bc | 3.6 bc | 3.1 abc |
| 6 | 50 | — | 25 | 25 | 6.5 | 24.4 a | 23.2 a | 1.3 a | 2.5 a |

[1]Percent of each by volume.
[2]Two leaves, length plus width/4.
[3]1 = poor quality, 3 = good, salable, 5 = excellent quality.
[4]Mean separation between columns as determined by Duncan's multiple range, 1% level. (D. B. Duncan loc. cit.)

As may be observed from the Table 7, changing the potting medium had no effect on average leaf size and average top weights were similar except at the highest level of rutile sand humate presence. At that level of presence, these growth indicators were significantly lower. Vine length, root weight and plant grade growth averages were greatest when 0.1 percent by volume of rutile sand humate was incorporated into the potting medium. The 5 and 10 percent rutile sand humate levels also gave growth as good or better than occurred with the controls. Although growth varied with the rate of fertilizer application, the lowest rate was generally best in this example as may be observed from the growth averages as given in Table 8, below.

TABLE 8

Effect of Fertilizer Level on *Philodendron scandens oxycardium*

| Series | Fertilizer Rate lbs N/A/yr | Average | | | | |
|---|---|---|---|---|---|---|
|  |  | Leaf Size[2] (cm) | Top wt. (gms) | Vine Length (cm) | Root wt. (gms) | Plant Grade[3] |
| A | 750 | 6.4 a[4] | 37.6 | 33.5 b[5] | 113.7 | 3.3 |
| B | 1500 | 6.7 b | 32.7 | 28.1 a | 107.7 | 3.0 |
| C | 2250 | 6.9 c | 33.3 | 29.0 ab | 86.6 | 3.0 |

[2]Two leaves, length plus width/4.
[3]1 = poor quality, 3 = good, salable 5 = excellent quality.
[4]Mean separation between columns as determined by Duncan's multiple range, 5% level. (D. B. Duncan, loc. cit.)
[5]Mean separation between columns as determined by Duncan's multiple range, 1% level. (D. B. Duncan, loc. cit.)

I claim:
1. A method of stimulating the growth of foliage plants selected from those of the group consisting of Calethea, Chamaedorea and Philodendron, which comprises; potting the plants in a conventional foliage plant potting media which includes as an active ingredient from 0.1 to 10 percent by volume of the potting media, of a humate, said humate being characterized in part by a carbon to hydrogen ratio (weight to weight) of from 9.5–17.5:1.0, a carbon to oxygen ratio of 1.0–2.0:1.0; an aluminum content of 2.8 to 8.4 percent by weight; a titanium content of 0.5 to 1.5 percent by weight and a calcium content of less than 0.5 percent by weight provided that when the plant selected is Calethea, the per- centage of active ingredient is within the range of 1.5 to 10.0 percent and when the plant selected is Chamaedorea, the percentage of active ingredient is within the range of 0.1 to 5 percent and when the plant selected is Philodendron, the percentage of active ingredient is within the range of 0.1 to 10 percent.

2. The method of claim 1 wherein said foliage plants are *Calethea makoyana*.

3. The method of claim 1 wherein said foliage plants are *Chamedorea elegans*.

4. The method of claim 1 wherein said foliage plants are *Philodendron scandens oxycardium*.

* * * * *

UNITED STATES PATENT AND TRADEMARK OFFICE
CERTIFICATE OF CORRECTION

PATENT NO. : 4,274,860
DATED : June 23, 1981
INVENTOR(S) : William C. Firth, Jr.

It is certified that error appears in the above—identified patent and that said Letters Patent is hereby corrected as shown below:

Col. 7, Table 4, line 1; - under heading "Top Wt. (gms) "$3.2b^3$"

should read -- $8.2b^3$ --

Col. 9, Table 6, footnote #1; "of" in the second instance should read -- by --

Col. 9, Table 7, at the beginning of chart "No. 4" should read -- No. 1 --

Signed and Sealed this

Second Day of September 1986

[SEAL]

Attest:

Attesting Officer

DONALD J. QUIGG

Commissioner of Patents and Trademarks